US010625765B2

(12) United States Patent
Love

(10) Patent No.: US 10,625,765 B2
(45) Date of Patent: Apr. 21, 2020

(54) REFLECTIVE STEERING WHEEL COVER AND METHOD

(71) Applicant: Darlene Love, San Jose, CA (US)

(72) Inventor: Darlene Love, San Jose, CA (US)

( * ) Notice: Subject to any disclaimer, the term of this patent is extended or adjusted under 35 U.S.C. 154(b) by 0 days.

(21) Appl. No.: 16/137,482

(22) Filed: Sep. 20, 2018

(65) Prior Publication Data

US 2020/0094865 A1  Mar. 26, 2020

(51) Int. Cl.
*B62D 1/06* (2006.01)
(52) U.S. Cl.
CPC ..................... *B62D 1/06* (2013.01)
(58) Field of Classification Search
CPC .... B62D 1/06; B65D 81/3886; Y10T 74/2087
USPC .................................. 74/558, 558.5
See application file for complete search history.

(56) References Cited

U.S. PATENT DOCUMENTS

| 4,102,377 | A |   | 7/1978  | Ostrem |               |
|-----------|---|---|---------|--------|---------------|
| 4,287,621 | A | * | 9/1981  | Kertz  | B60N 3/00     |
|           |   |   |         |        | 224/276       |
| 4,685,499 | A |   | 8/1987  | Black  |               |
| 4,993,281 | A |   | 2/1991  | Miller |               |
| 5,131,290 | A |   | 7/1992  | Atkinson |             |
| 5,157,986 | A |   | 10/1992 | Keller |               |
| 5,743,154 | A | * | 4/1998  | Jacinth | B62D 1/06    |
|           |   |   |         |         | 74/558       |
| 6,926,304 | B2 | * | 8/2005 | Miyaji  | B60R 21/2644 |
|           |   |   |         |         | 280/741      |
| D654,000  | S | * | 2/2012  | Chiquin | D12/177     |
| 9,452,771 | B2 | * | 9/2016 | He      | B62D 1/06    |
| 2004/0182195 | A1 |   | 9/2004 | Bateman |             |
| 2015/0239487 | A1 | * | 8/2015 | Huang   | B62D 1/06    |
|              |    |   |        |         | 74/558      |
| 2016/0129665 | A1 | * | 5/2016 | Cho     | B32B 5/022   |
|              |    |   |        |         | 442/370     |
| 2017/0120845 | A1 | * | 5/2017 | Coley   | B62D 1/06    |
| 2017/0137050 | A1 | * | 5/2017 | Michelmann | B62D 1/046 |
| 2017/0197651 | A1 | * | 7/2017 | Huang   | B62D 1/06    |

FOREIGN PATENT DOCUMENTS

DE    2622427 A1 * 11/1977   ............. B62D 1/06

OTHER PUBLICATIONS

Castaleca Aluminum Foil Car Steering Wheel Cover sold at aliexpress.com; https://www.aliexpress.com/item/Castaleca-Aluminum-Foil-Car-Steering-Wheel-Sun-Shade-Cover-Heat-Reflector-44cm-Diameter/32817041987.html (Year: 2019).*

* cited by examiner

*Primary Examiner* — Adam D Rogers
(74) *Attorney, Agent, or Firm* — Charles Runyan

(57) ABSTRACT

A cover which may be useful for preventing irradiation of a steering wheel. The cover includes a cover-face, a lip, and a radiant barrier. The cover-face is flat, is constructed of a flexible material, and may be defined by a diameter. The lip is affixed to the cover-face and is rounded away from the cover-face, being shaped to deform about and grasp the curved outer surface of a steering wheel. The lip may be sufficiently flexible to be expanded in diameter up to one inch, such that it may be bent about a steering wheel during installation. The radiant barrier is attached to the cover face. The radiant barrier is able to reflect ultraviolet radiation, thereby preventing irradiation of the steering wheel when the cover is installed.

16 Claims, 5 Drawing Sheets

REFLECTIVE STEERING WHEEL COVER AND METHOD

CROSS-REFERENCE TO RELATED APPLICATION(S)

The present application is related to and claims priority to U.S. Provisional Patent Application No. 62/535,000 filed Jul. 20, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of protective covers of existing art and more specifically relates to steering wheel covers.

RELATED ART

Steering wheel covers are accessories that protect the vehicle steering wheel from wear. They can help to maintain the resale value of the vehicle by protecting it from scuffs, scratches, and the like. Vehicle interiors often increase in temperature as the vehicle is parked outdoors. Sunlight heats the interior and both the steering wheel and seats reach extremely hot temperatures. People may be uncomfortable and even burn themselves on the steering wheel and seats. Some drivers may use windshield covers; however, these products are typically bulky and inconvenient. An efficient solution is desired.

U.S. Pat. No. 4,993,281 to Jess J. Miller relates to a flexible steering wheel heat shield. The described flexible steering wheel heat shield includes a steering wheel cover having an overlying front panel and a secondary rear panel attached thereto to form a pocket into which the associated steering wheel can be slidably and releasably received. The overlying front panel and secondary rear panel are each constructed from at least two sheets of metallized nylon having outer selvages bonded to each other to form at least one sealed air pocket. In the preferred embodiment, the overlying front panel also contains an intermediate insulating sheet completely contained within the two respective metallized sheets. The intermediate insulating sheet has a synthetic material base and an overlying layer bonded thereto.

SUMMARY OF THE INVENTION

In view of the foregoing disadvantages inherent in the known steering wheel cover art, the present disclosure provides a novel reflective steering wheel cover and method. The general purpose of the present disclosure, which will be described subsequently in greater detail, is to provide an effective and efficient reflective steering wheel cover for use.

A cover is disclosed herein. The cover may be useful for preventing irradiation of a steering wheel. The cover includes a cover-face, a lip, and a radiant barrier. The cover-face is flat, is constructed of a flexible material, and may be defined by a diameter. The lip is affixed to the cover-face and is rounded away from the cover-face, being shaped to deform about and grasp the curved outer surface of a steering wheel. The lip may be sufficiently flexible to be expanded in diameter up to one inch, such that it may be bent about a steering wheel during installation. The radiant barrier is attached to the cover face. In some embodiments it may be laminated to the cover-face, while in others it may be integral to the cover-face. The radiant barrier is able to reflect ultraviolet radiation, thereby preventing irradiation of the steering wheel when the cover is installed.

According to another embodiment, a method of preventing irradiation of a steering wheel is also disclosed herein. The method of preventing irradiation of a steering wheel includes providing the above-described cover, placing the cover-face against a steering wheel, bending the lip around and behind the edge of the steering wheel, releasing the lip, reflecting ultraviolet radiation using the radiant barrier, pulling the lip up from behind the edge of the steering wheel, and removing the cover-face from the steering wheel.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a reflective steering wheel cover and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a steering wheel cover and more particularly to a reflective steering wheel cover and method as used to improve the prevention of irradiation of a steering wheel.

Generally, the reflective steering wheel cover is a protective cover for a vehicle steering wheel able to prevent the wheel from becoming too hot while a vehicle is parked outdoors. This is accomplished by the use of a reflective material to ensure the steering wheel is cool to touch once a driver returns to the vehicle. The cover envelopes the steering wheel partially or completely, and most importantly covers the outer portion of the wheel. This method eliminates the need to use a windshield cover in order to prevent a steering wheel from being too hot to touch after a vehicle is parked. The use of the cover presents a simple and convenient method to protecting a steering wheel from excessive heat.

Referring now more specifically to the drawings by numerals of reference, there is shown in FIGS. 1-4, various views of a cover 100.

Figure 1:
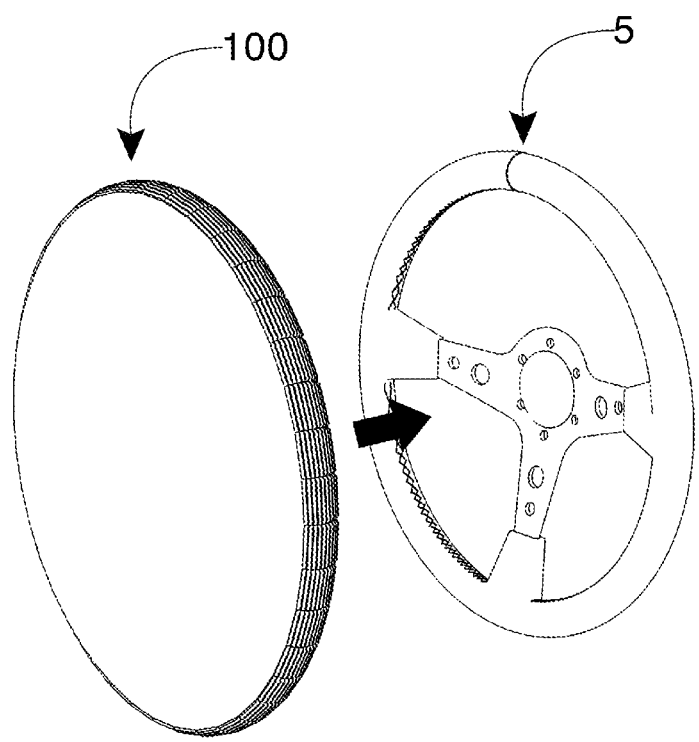
FIG. 1 is a perspective view of the cover during an 'in-use' condition, according to an embodiment of the disclosure.

FIG. 1 shows a cover 100 during an 'in-use' condition 50, according to an embodiment of the present disclosure. Here, cover 100 may be beneficial for use by a user to prevent irradiation of a steering wheel. As illustrated, cover 100 may be structured to envelop steering wheel 5 and protect steering wheel 5 from ultraviolet radiation.

Figure 2:
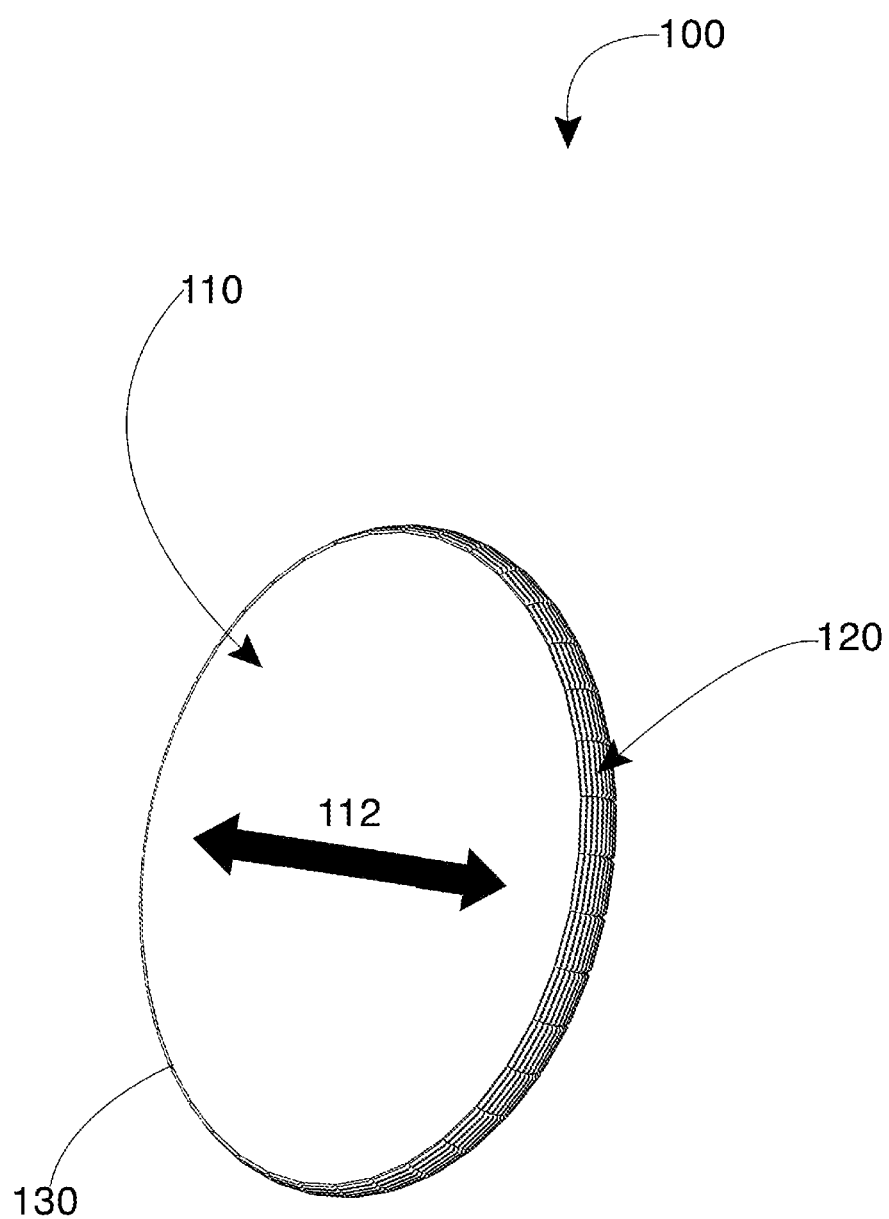
FIG. 2 is a perspective view of the cover of FIG. 1, according to an embodiment of the present disclosure.

FIG. 2 shows the cover 100 of FIG. 1, according to an embodiment of the present disclosure. As illustrated, the cover 100 may include cover-face 110, lip 120, and radiant barrier 130. Cover-face 110 may have cover-diameter 112 and may be both planar and flexible. Lip 120 may be affixed to and may circumscribe cover-face 110, such that lip 120 is configured to partially circumscribe and grasp steering wheel 5, thereby retaining cover-face 110 to steering wheel 5. Lip 120 may have sufficient flexibility to be expanded in diameter up to at least one inch and may have a rounded contour to match the curvature of steering wheel 5 (FIG. 1). Radiant barrier 130 may be laminated to or alternatively integral to both cover-face 110 and lip 120. Radiant barrier 130 may be configured to reflect ultraviolet radiation away from steering wheel 5 (FIG. 1) when lip 120 is installed about steering wheel 5 (FIG. 1). Cover-face 110 may be substantially circular in shape, and lip 120 may circumscribe cover-face 110 by a full three-hundred and sixty degrees. Lip 120 may be pre-formed into a curved channel which radially circumscribes cover-face 110, with the curved channel of lip 120 being semi-circular in shape, such that it may surround steering wheel 5 (FIG. 1) by one-hundred and eighty degrees in a preferred embodiment. In some embodiments, lip 120 may be reinforced at a distal edge with a disparate material providing strength and rigidity to lip 120. Lip 120 may be integral to cover 110. However, in other embodiments, lip 120 may be affixed to cover-face 110 by stitching, fasteners, or other methods.

Figure 3:
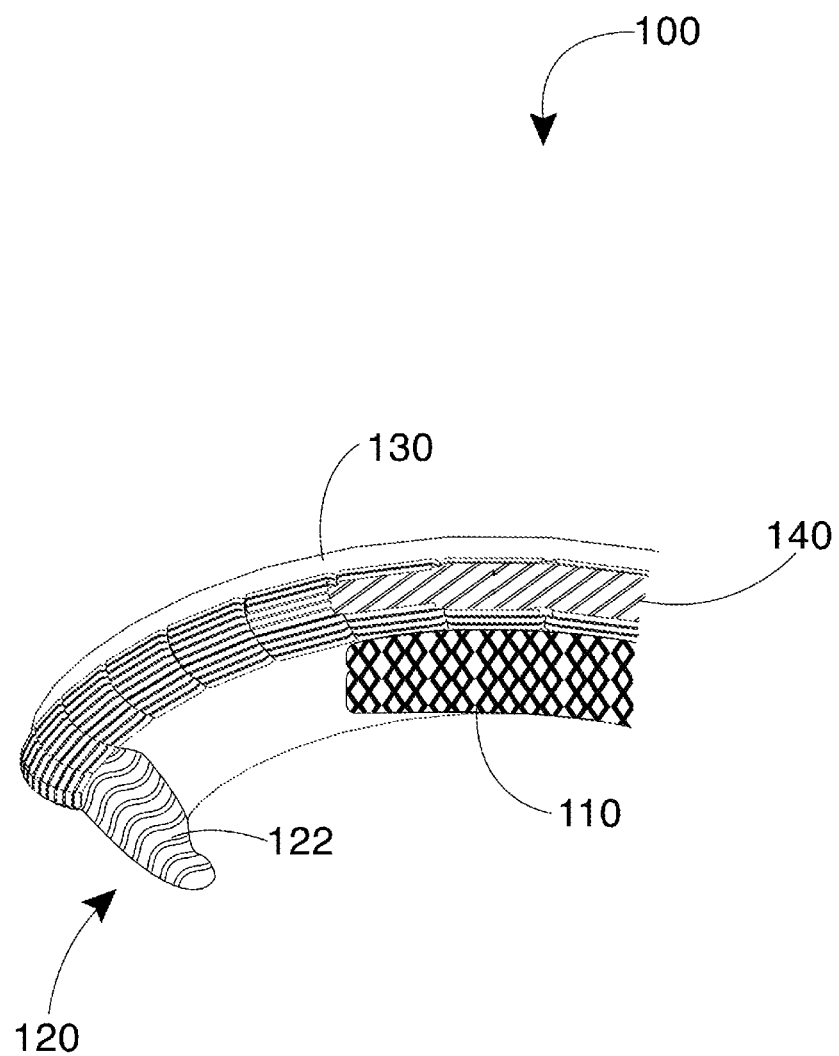
FIG. 3 is a cutaway view of the cover of FIG. 1, according to an embodiment of the present disclosure.

FIG. 3 is a cutaway view of the cover 100 of FIG. 1, according to an embodiment of the present disclosure. As shown, lip 120 may further include elastic element 122. Elastic element may enable lip 120 to be expanded around steering wheel 5 (FIG. 1) when installing the cover about steering wheel 5 (FIG. 1). Cover 100 may further include insulating layer 140, such that insulating layer 140 is disposed beneath radiant barrier 130. Insulating layer 140 may be constructed of foam, nylon fiber, ceramic fiber, polymer, or other materials. In some embodiments insulating layer 140 may include air gaps to improve insulating function. Preferably, radiant barrier 130 is constructed of a material having an emissivity of less than 0.1, being configured to reflect radiation. Accordingly, radiant barrier 130 may be constructed of aluminum, all alloy thereof, or another reflective material. Radiant barrier 130 may measure between three and five thousandths of an inch in thickness. Cover-face 110 and lip 120 may each be constructed polyethylene terephthalate in some embodiments.

Figure 4A:
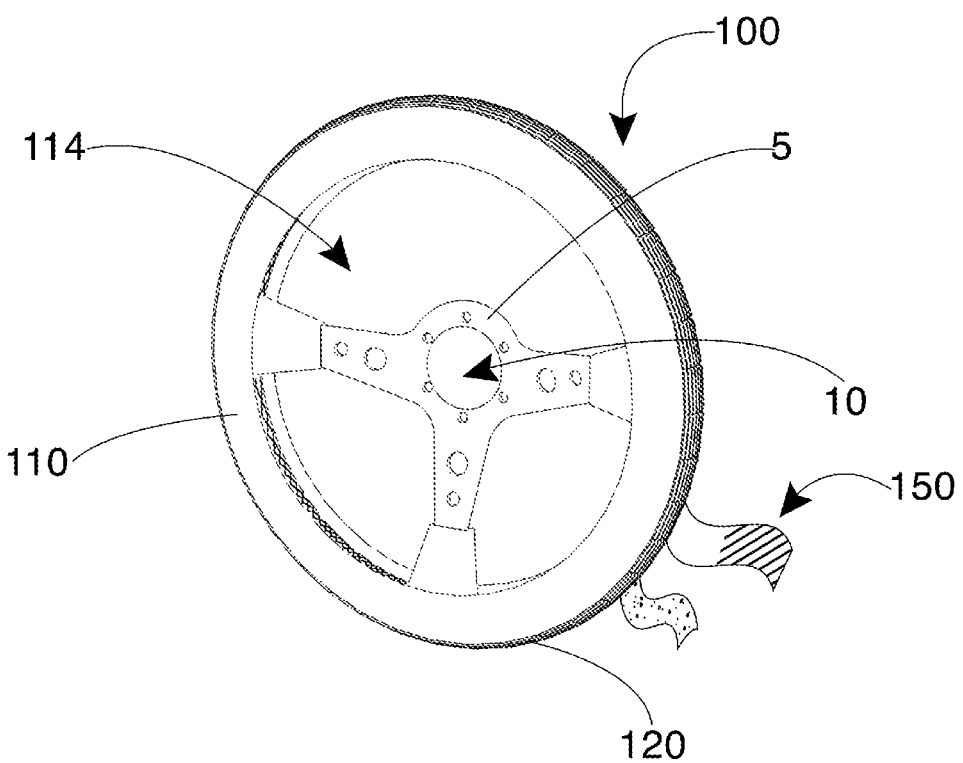
FIG. 4A is a perspective view of the cover of FIG. 1, according to an embodiment of the present disclosure.

FIG. 4A is a perspective view of an alternative embodiment of the cover 100 of FIG. 1. In the illustrated embodiment, cover-face 110 may include aperture 114. Aperture 114 may be concentric to lip 120 and may be configured to expose center 10 of steering wheel 5 when lip 120 is installed about steering wheel 5. Cover 100 may further include at least one fastener 150. At least one fastener 150 may be configured to retain lip 120 to steering wheel 5. At least one fastener 150 may include at least one hook-and-loop fastener in some embodiments. Cover-face 110 may be substantially circular in shape, and lip 120 may circumscribe cover-face 110 by a full three-hundred and sixty degrees.

Figure 4B:
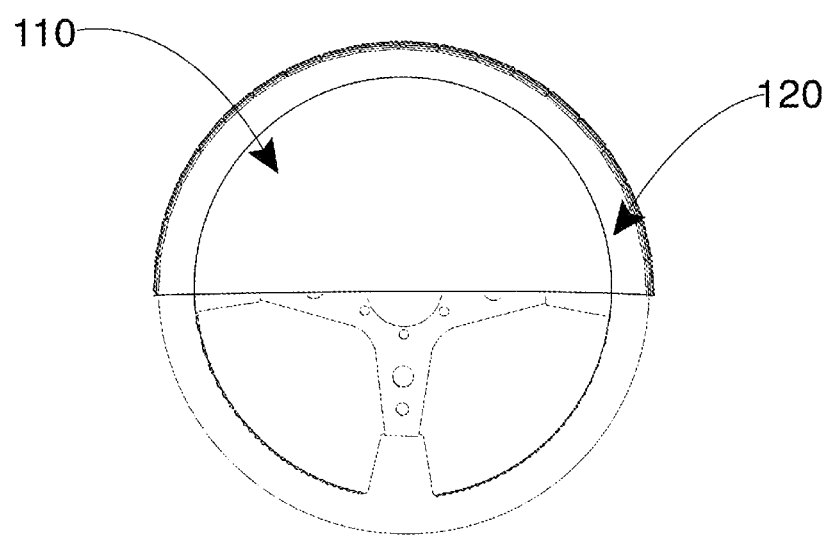
FIG. 4B is a perspective view of the cover of FIG. 1, according to an embodiment of the present disclosure.

FIG. 4B is a perspective view of an alternative embodiment of the cover 100 of FIG. 1. In the illustrated embodiment, cover-face 110 may be substantially semi-circular in shape as shown. Accordingly, lip 120 circumscribes cover-face 110 by no more than two-hundred and seventy degrees, such that a portion of steering wheel 5 (FIG. 1) is left exposed. In similar embodiments, lip 120 may circumscribe cover-face 110 by as little as one-hundred and eighty degrees. Upon reading this specification, it should be appreciated that, under appropriate circumstances, considering such issues as user preferences, design preference, structural requirements, marketing preferences, cost, available materials, technological advances, etc., other structural arrangements such as, for example, additional attachment means, alternative surface designs, extra materials, etc., may be sufficient.

Figure 5:
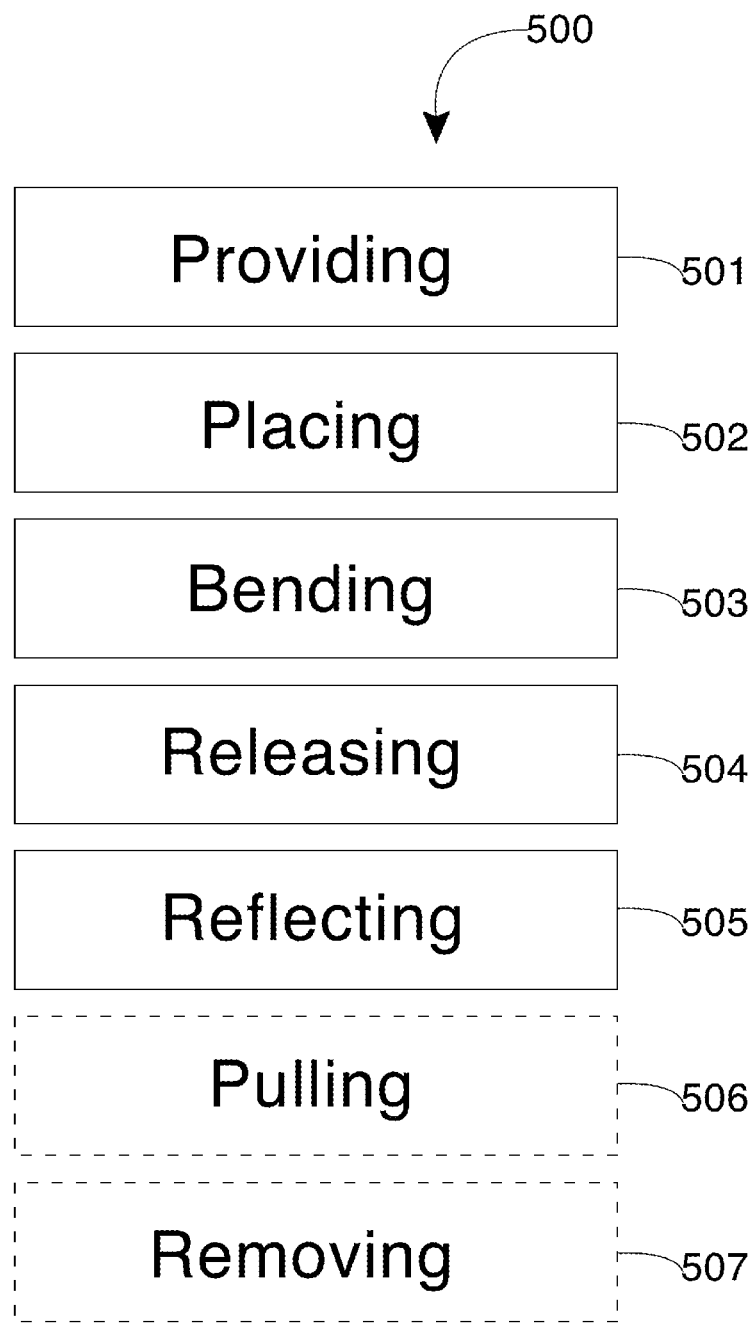
FIG. 5 is a flow diagram illustrating a method of use for preventing irradiation of a steering wheel, according to an embodiment of the present disclosure.

FIG. 5 is a flow diagram illustrating a method for preventing irradiation of a steering wheel, according to an embodiment of the present disclosure. In particular, the method for preventing irradiation of a steering wheel 500 may include one or more components or features of the cover 100 as described above. As illustrated, the method for preventing irradiation of a steering wheel 500 may include the steps of: step one 501, providing reflective steering wheel cover able to envelop a steering wheel, the reflective steering wheel cover comprising a flexible cover-face having a cover-diameter, the cover-face being substantially planar, a rounded lip affixed to and circumscribing the cover-face, the lip being configured to partially circumscribe and grasp the steering wheel, thereby retaining the cover-face to the steering wheel, the lip having sufficient flexibility to be expanded in diameter up to at least one inch, and a radiant barrier laminated to and alternatively integral to each of the cover face and the lip, the radiant barrier being configured to reflect ultraviolet radiation away from the steering wheel when the lip is installed about the steering wheel; step two 502, placing the cover-face against a steering wheel; step three 503, bending the lip around and behind the edge of the steering wheel; step four 504, releasing the lip; step five 505, reflecting ultraviolet radiation using the radiant barrier; step six 506, pulling the lip up from behind the edge of the steering wheel; and step seven 507, removing the cover-face from the steering wheel.

It should be noted that steps 506 and 507 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for preventing irradiation of a steering wheel, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A cover able to envelop a steering wheel, the cover comprising:
    a flexible cover-face having a cover-diameter, the cover-face being substantially planar;
    a rounded lip affixed to and circumscribing the cover-face, the lip being configured to partially circumscribe and grasp the steering wheel, thereby retaining the cover-face to the steering wheel, the lip having sufficient flexibility to be expanded in diameter up to at least one inch;
    and
    a radiant barrier having an emissivity of less than 0.1 laminated to and alternatively integral to each of the cover-face and the lip, the radiant barrier being configured to reflect ultraviolet radiation away from the steering wheel when the lip is installed about the steering wheel.

2. The cover of claim 1, wherein the cover-face includes an aperture, the aperture being concentric to the lip, the aperture being configured to expose a center of the steering wheel when the lip is installed about the steering wheel.

3. The cover of claim 1, wherein the lip includes an elastic element enabling a user to expand the lip around the steering wheel when installing the cover about the steering wheel.

4. The cover of claim 1, wherein the cover further includes an insulating layer disposed beneath the radiant barrier and the insulating layer comprises foam.

5. The cover of claim 1, wherein the cover further includes an insulating layer disposed beneath the radiant barrier and the insulating layer comprises ceramic fiber.

6. The cover of claim 1, wherein the radiant barrier measures between three and five thousandths of an inch in thickness.

7. The cover of claim 1, wherein the radiant barrier comprises aluminum.

8. The cover of claim 1, wherein the cover-face and the lip each comprise polyethylene terephthalate.

9. The cover of claim 1, further comprising at least one fastener configured to retain the lip to the steering wheel.

10. The cover of claim 9 wherein the at least one fastener comprises at least one hook-and-loop fastener.

11. The cover of claim 1, wherein the cover-face is substantially circular in shape, and the lip circumscribes the cover-face by a full three-hundred and sixty degrees.

12. The cover of claim 1, wherein the cover-face is substantially semi-circular in shape.

13. The cover of claim 12, wherein the lip circumscribes the cover-face by no more than two-hundred and seventy degrees.

14. A method of shielding a steering wheel from ultraviolet radiation, the method comprising the steps of:
    providing the reflective steering wheel cover of claim 1;
    placing the cover-face against the steering wheel;
    bending the lip around and behind an edge of the steering wheel;
    releasing the lip;
    and
    reflecting ultraviolet radiation using the radiant barrier.

15. A reflective steering wheel cover able to envelop a steering wheel, the reflective steering wheel cover comprising:
    a flexible cover-face having a cover-diameter, the cover-face being substantially planar;
    a rounded lip affixed to and circumscribing the cover-face, the lip being configured to partially circumscribe and grasp the steering wheel, thereby retaining the cover-face to the steering wheel, the lip having sufficient flexibility to be expanded in diameter up to at least one inch;
    and
    a radiant barrier laminated to and alternatively integral to each of the cover face and the lip, the radiant barrier being configured to reflect ultraviolet radiation away from the steering wheel when the lip is installed about the steering wheel;
wherein the lip includes an elastic element enabling a user to expand the lip around the steering wheel when installing the cover about the steering wheel;
wherein the cover further includes an insulating layer disposed beneath the radiant barrier;
wherein the radiant barrier is constructed of a material having an emissivity of less than 0.1;
wherein the radiant barrier comprises aluminum; and
wherein the cover-face is substantially circular in shape, and the lip circumscribes the cover-face by a full three-hundred and sixty degrees.

16. A steering wheel cover comprising:
    a flexible cover-face having a cover-diameter, the cover-face being substantially planar;
    a rounded lip affixed to and circumscribing the cover-face, the lip being configured to partially circumscribe and grasp the steering wheel, thereby retaining the cover-face to the steering wheel, the lip having sufficient flexibility to be expanded in diameter up to at least one inch;
    a radiant barrier laminated to and alternatively integral to each of the cover-face and the lip, the radiant barrier being configured to reflect ultraviolet radiation away from the steering wheel when the lip is installed about the steering wheel;
    and
an insulating layer comprising nylon fiber disposed beneath the radiant barrier.

* * * * *